United States Patent [19]

Mohan et al.

[11] Patent Number: 5,334,877
[45] Date of Patent: * Aug. 2, 1994

[54] STANDBY POWER SUPPLY WITH LOAD-CURRENT HARMONICS NEUTRALIZER

[75] Inventors: Ned Mohan, St. Paul; Maximilian R. Peterson, Rochester, both of Minn., now by change of name from Reza Ghotbi

[73] Assignee: Electric Power Research Institute, Palo Alto, Calif.

[ * ] Notice: The portion of the term of this patent subsequent to Dec. 15, 2009 has been disclaimed.

[21] Appl. No.: 992,845

[22] Filed: Dec. 15, 1992

Related U.S. Application Data

[63] Continuation of Ser. No. 661,341, Feb. 25, 1991, Pat. No. 5,172,009.

[51] Int. Cl.$^5$ .............................. H02J 9/00; H02J 9/06
[52] U.S. Cl. ...................................... 307/46; 307/66; 307/105
[58] Field of Search ...................... 307/46, 64, 66, 105; 323/207; 363/40, 44

[56] References Cited

U.S. PATENT DOCUMENTS

| | | |
|---|---|---|
| 4,053,820 | 10/1977 | Peterson et al. . |
| 4,224,660 | 9/1980 | Mohan . |
| 4,410,935 | 10/1983 | Dang . |
| 4,500,853 | 2/1985 | Stifter . |
| 4,562,357 | 12/1985 | Miyazawa . |
| 4,631,471 | 12/1986 | Foudad et al. . |
| 4,706,860 | 3/1990 | Asaeda . |
| 4,707,618 | 11/1987 | Haas . |
| 4,764,684 | 8/1988 | Fiorina et al. . |
| 4,780,801 | 10/1988 | Gil et al. . |
| 4,827,392 | 5/1989 | Miguchi . |
| 4,876,460 | 10/1989 | Johnson . |
| 5,001,619 | 3/1991 | Nakajima et al. . |
| 5,017,800 | 5/1991 | Divan .................................. 307/66 |
| 5,047,909 | 9/1991 | Hosada . |
| 5,172,009 | 12/1992 | Mohan et alk. ........................ 307/46 |
| 5,221,862 | 6/1993 | Fiorina et al. ........................ 307/66 |

FOREIGN PATENT DOCUMENTS

| | | |
|---|---|---|
| 1236524 | 5/1988 | Canada . |
| 35727 | 8/1984 | European Pat. Off. . |
| 330755 | 9/1989 | European Pat. Off. . |
| 61-236373 | 10/1986 | Japan . |
| 62-178128 | 8/1987 | Japan . |
| 1321871 | 12/1989 | Japan . |
| 2-100116 | 4/1990 | Japan .............................. G05F 1/70 |
| 4-117135 | 4/1992 | Japan ...................................... 307/66 |
| 1327228 | 7/1987 | U.S.S.R. . |

OTHER PUBLICATIONS

The attached Appendix shows a schematic block diagram of a known conventional UPS system.

(List continued on next page.)

Primary Examiner—William H. Beha, Jr.
Attorney, Agent, or Firm—Flehr, Hohbach, Test, Albritton & Herbert

[57] ABSTRACT

A standby power supply system is provided for supplying normal AC power to a critical load from an AC power source during normal operating conditions, and for supplying emergency AC power to the load during failure of the AC power source. During normal operation, the standby power supply system actively neutralizes undesirable harmonic components in the input current drawn by the load. The standby power supply system includes a power conversion device having a DC side coupled to a back-up power source and an AC side in parallel with the load and the AC source. A harmonic distortion sensor senses a harmonic distortion current component of a load current drawn by the load during normal operating conditions. A controller is responsive to the harmonic distortion sensor for causing the power conversion device to produce a harmonics neutralizing current to substantially neutralize the harmonic distortion current component produced by the load. A method is also provided for supplying AC power to a load during normal and emergency operating conditions.

10 Claims, 4 Drawing Sheets

OTHER PUBLICATIONS

T. Kawabata, et al., "Chargerless UPS Using Multi-Functional BIMOS Inverter . . . ", *Conference Record of the 1986 IEEE Industry Applications Society Annual Meeting*, vol. 1, pp. 513–520 (Sep. 28, 1986).

T. Kawabata, et al., "UPS Systems Using Multi-Functional Inverters", *Intelec '87: Ninth International Telecommunications Energy Conference . . . Proceedings*, pp. 525–530 (Jun. 14, 1987).

T. Kawabata, et al., "Three Phase Parallel Processing UPS Using Multi-Functional Inverter," *1989 IEEE IAS Annual Meeting*, pp. 982–987.

T. Kawabata, et al., "Parallel Processing Inverter System," *1990 IPEC Conference* (Tokyo, Japan), pp. 107–114.

H. Yonemori, et al., "A Novel Type of High-Quality UPS System . . . ", *Official Proceedings of the First International PCIM '88 (Power Conversion) Conference*, pp. 324–332 (Dec. 8, 1988).

Y. Cheron, et al., "Facing UPS Requirements: PWM or Resonance?", *Y. Rev. Gen. Electr.* (France) No. 2, pp. 41–46 (Feb. 1989).

M. Taniai, et al., "UPS Parallel Processing with Commercial Power Source", *Sanken Tech. Rep.* (Japan) vol. 20, No. 1, pp. 74–79 (Nov. 1988).

K. Harada, et al., "Stability Improvement . . . for Triport UPS System", *Intelec. Tenth International Telecommunications Energy Conference*, pp. 536–541 (Oct. 30, 1988).

J. Holtz, et al., "A High-Power Multitransistor-Inverter Uninterruptible Power Supply System", *IEEE Trans. Power Electron* (USA) vol. 3, No. 3, pp. 278–285 (Jul. 1988).

J. Holtz, et al., "A High-Power Multitransistor Inverter Uninterruptible Power Supply System", *PESC '86 Record, 17th Annual IEEE Power Electronics Specialists Conference*, pp. 311–320 (Jun. 23, 1986).

S. Manias, et al., "Bilateral DC to AC Converter Employing a High Frequency Link," *1985 IEEE/IAS Annual Meeting Record*, pp. 1156–11262.

P. K. Sood, et al., "A Versatile Power Converter for High Frequency Link Systems," *APEC/IEEE* (1987) pp. 249–256.

T. Shirae, et al., "Development of Five Novel 10 KaVA UPS's for Office Use," *1990 IPEC Conference* (Tokyo, Japan), pp. 91–98.

M. Koyama, et al., "High Frequency Link DC/AC Converter with PWM Cycloconverter for UPS," *1990 IPEC Conference* (Tokyo, Japan), pp. 748–754.

T. A. Lipo and P. K. Sood, "Study of Generator/Motor Operation of Induction Machines in a High Frequency Link Space Power System," *NASA Contractor Report No. 179600, Prepared for the Lewis Research Center Under Grant No. NAG3-631* (Mar. 1987), Abstract.

STANDBY POWER SUPPLY WITH LOAD-CURRENT HARMONICS NEUTRALIZER

This is a continuation of application Ser. No. 07/661,341, filed Feb. 25, 1991, now U.S. Pat. No. 5,172,009.

BACKGROUND OF THE INVENTION

The present invention relates generally to an uninterruptible power supply (UPS) system for interfacing a critical load with a utility power source and for supplying battery backup power to the critical load during emergency conditions, such as utility power line outages, and more particularly to an improved standby power supply (SPS) system, such as may be used to provide power to computer, communication and medical equipment.

A revolution in the fields of microelectronics technology and the information sciences has led to the widespread use of critical electrical loads, such as personal computers. The communication and medical fields have also advanced with this revolution, with electronic devices now providing crucial services and functions. This trend is expected to continue in the future. Such loads typically operate on single-phase alternating current (AC) power received from an electric utility. During a utility power outage, a battery backup is often required to avoid the loss of critical information, functions or services. A variety of UPS systems have been designed to meet these emergency power needs.

Conventional UPS systems provide an interface between the utility power system input and a critical load (personal computers, communication and medical equipment, and other loads normally receiving AC power and requiring battery backup power will herein be referred to as "critical loads"). Basically, the AC power from the utility is first rectified, and a small portion of the rectified power is used to charge the backup battery. The remaining portion of the rectified power is supplied to the critical load through an inverter, which converts the DC voltage to nearly sinusoidal line-frequency (e.g., 50 Hz in Europe or 60 Hz in the Unites States) voltage, to the critical load. During a utility power outage emergency condition, power is supplied by the battery through the inverter to the load.

Conventional UPS systems typically have a rectifier/charger which receives AC power from an AC power utility through a static interrupter and rectifies it into DC power. A portion of the rectified DC power charges a battery bank during normal operating conditions. A line-frequency isolation transformer is often included between the interrupter and the critical load. During normal operating conditions, the interrupter is closed to allow the AC power to flow therethrough to a critical load.

During a utility power outage, the static interrupter opens to isolate the load from the utility. The battery bank powers the load through a pulse width modulated (PWM) DC-to-AC inverter. Line-frequency isolation transformers may be placed between the inverter and the load. Thus, power is maintained to the load during both normal and emergency operating conditions. Alternatively, during normal operation, power is supplied to the load through the rectifier/charger, the inverter and an isolation transformer. In this alternate embodiment, the AC power supplied through the interrupter and isolation transformer (if used) is merely an additional backup feature to further enhance the reliability of the UPS system.

The known conventional UPS systems suffer several significant drawbacks. For example, the line-frequency isolation transformers are bulky, expensive and introduce substantial power losses into the UPS system.

The conventional UPS systems disadvantageously inject undesirable current harmonics into the utility system. These injected current harmonics produce line voltage distortion which interferes with other loads connected to the same line voltage supply. The rectifier/charger and the inverter are each sources of these undesirable current harmonics. However, the inverter harmonic currents are decoupled from the utility by the rectifier/charger and by using an isolation transformer. An active filtering system to actively neutralize harmonic currents injected by an AC-to-DC converter into an AC power transmission system is disclosed in U.S. Pat. Nos. 4,053,820 and 4,224,660 (the inventor of the present invention being a co-inventor and the sole inventor, respectively, of these patents).

Another significant source of undesirable current harmonics is the critical load itself, which is often some form of a DC power supply. These high technology electrical loads typically have a highly nonlinear input characteristic, that is, the input current drawn by these loads is rich in harmonics of the fundamental line frequency. For example, the lower-order harmonics, such as the third and fifth harmonic current components, can have very large magnitudes. Conventionally, the input section of rectifier/charger is a diode-bridge rectifier. The electrical characteristics at the input of this diode-bridge rectifier are identical to the input characteristics of the critical load. Therefore, the current drawn from the utility by the conventional UPS system comprises large amplitudes of harmonic currents. These harmonic currents can significantly interfere with other loads on the electric power line and with nearby telephone equipment. Additionally, these harmonics cause unnecessary heating of these other loads, and often contribute to a malfunction of ripple control systems within these other loads.

A variation of the above UPS system arrangement is known as a standby power supply (SPS) system. Under normal conditions, the SPS system delivers AC power directly from the utility to the critical load. During an emergency power outage, the SPS system supplies battery power through an inverter to the critical load. As mentioned above, the highly nonlinear input characteristic of the critical load draws a load current that is rich in harmonics of the fundamental line frequency. Since the critical load is supplied directly from the utility via the SPS system under normal conditions, the current drawn from the utility by the SPS system has large amounts of harmonic components. Therefore, both the conventional UPS and SPS systems disadvantageously draw undesirable harmonic current components from the utility system.

Thus a need exists for an improved UPS system, and more particularly for an improved SPS system, which is directed toward overcoming, and which is not susceptible to, the above limitations and disadvantages.

SUMMARY OF THE INVENTION

According to one aspect of the present invention, an SPS system is provided including power conversion means having an AC side and a DC side. The power conversion means AC side is in parallel with an AC power source and a load for supplying emergency AC power to the load during failure of the AC power source. The load receives normal AC power from the AC power source during normal operating conditions. The SPS system also has a backup power source coupled to the DC side of the power conversion means. Harmonic distortion sensor means are provided for sensing a harmonic distortion current component of a load current drawn by the load during normal operating conditions. The SPS system also has a controller responsive to the harmonic distortion sensor means for causing the power conversion means to produce a harmonics neutralizing current to substantially neutralize the harmonic distortion current component produced by the load.

In an illustrated embodiment, the SPS system includes an inverter having an AC side and DC side, with the inverter being responsive to an inverter control signal. The AC side of the inverter is in parallel with both an AC power source and the load, while a battery bank is coupled to the DC side of the inverter. A load current sensor senses the current delivered to the load, and in response thereto produces a load current sensor signal. An inverter current sensor, located to the AC side of the inverter, senses the AC current produced by the inverter and in response thereto produces an inverter current sensor signal. The SPS system has a controller of a type which, during normal operation, produces the inverter control signal in response to the load current sensor signal and the inverter current sensor signal. In response to the inverter control signal, the inverter produces a harmonics neutralizing current to substantially neutralize undesirable harmonic currents produced by the load. In this manner, the load current harmonics are substantially prevented from adversely affecting the AC power source. Thus, the load current harmonics are neutralized by the SPS system and remain isolated therein from the utility.

Under normal conditions when the utility voltage is present, the SPS system draws a sinusoidal current from the AC utility and provides it directly to the load as real power, with load-current harmonics neutralized as described above. Also during normal operation, the inverter provides a charging current to a backup battery so that the battery remains charged at an appropriate voltage level. During a utility power outage emergency condition, an isolation device isolates the SPS system from the utility voltage source. The inverter inverts DC power from the backup battery to provide the AC power required to maintain critical load operation during the utility outage.

According to another aspect of the present invention, a high frequency link SPS system is provided having first and second converters. The second converter is in parallel with an AC power source and a load for supplying emergency AC power to the load during failure of the AC power source. The load receives normal AC power from the AC power source during normal operating conditions. The high frequency link SPS system also includes a high frequency transformer linking together the first and second converters. A backup power source is coupled to the first converter. The system also includes harmonic distortion sensor means for sensing a harmonic distortion current component of a load current drawn by the load during normal operating conditions. A controller is provided which is responsive to the harmonic distortion sensor means for causing the second converter to produce a harmonics neutralizing current to substantially neutralize the harmonic distortion current component produced by the load. A controller is provided which is responsive to the harmonic distortion sensor means for causing the second converter to produce a harmonics neutralizing current to substantially neutralize the harmonic distortion current component produced by the load.

According to another aspect of the present invention, a method is provided of supplying normal AC power to a critical load from an AC power source during normal operating conditions, and of supplying emergency AC power to the load during failure of the AC power source. This method includes the steps of providing an SPS system as described above. During normal operating conditions, the method includes the steps of sensing a harmonic distortion current component of a load current drawn by the load with a harmonic current distortion sensor. In a controlling step, the power conversion device is controlled in response to the harmonic distortion sensor. In a producing step, an AC harmonics neutralizing current is produced with the power conversion device in response to the controller.

According to a further aspect of the present invention, a method is provided of supplying AC power to a load during normal and emergency operating conditions. This method includes the step of providing an SPS system having a power conversion device with an AC side and a DC side. The AC side of the power conversion device is in parallel with an AC power source and a load. The power conversion device is responsive to a control signal. A back-up power source is coupled to the DC side of the power conversion device. The SPS system is also provided with a harmonic distortion sensor and a controller. During normal operating conditions, the method includes the steps of sensing a harmonic distortion current component of a load current drawn by the load with a harmonic current distortion sensor. In a controlling step, the power conversion device is controlled in response to the harmonic distortion sensor. In a producing step, an AC harmonics neutralizing current is produced with the power conversion device in response to the controller. During emergency operating conditions, the method includes the steps of isolating the standby power supply system and the load from the AC power source when the AC power source collapses below a predetermined acceptable value. In a controlling step, the power conversion device is controlled with the controller. In an inverting step, backup power from the backup power source is inverted with the power conversion device in response to the controller to supply emergency AC power to the load.

It is an overall object of the present invention to provide an improved standby power supply system and a method for providing power to a critical load during both normal and emergency conditions.

A further object of the present invention is to provide an improved SPS system and method that during normal operation actively filters undesirable current harmonics, such as the load-current harmonics produced by the critical load, to substantially prevent these harmonics from adversely effecting the AC power source, such as a utility system.

Still a further object of the present invention is to provide an improved SPS system and method for use with a non-linear critical load, which appears to an AC power source, such as a utility system, during normal operation to be a substantially linear load.

Another object of the present invention is to provide an SPS system which is less costly to manufacture and operate than other known SPS or UPS systems.

Still a further object of the present invention is to provide an SPS system which is physically smaller than other known SPS or UPS systems.

An additional object of the present invention is to provide an improved SPS system and method for providing battery backup power to a critical load during emergency conditions.

A further object of the present invention is to provide an improved SPS system which does not require a conventional diode-rectifier input section.

Yet another object of the present invention is to provide an improved SPS system and method which are highly reliable.

The present invention relates to the above features and objects individually as well as collectively. These and other objects, features and advantages of the present invention will become apparent to those skilled in the art from the following description and drawings.

BRIEF DESCRIPTION OF THE DRAWINGS

FIG. 5 is a single line, schematic block diagram of an alternate form of a standby power supply system of the present invention comprising a high frequency link standby power supply system;

FIG. 7a is a schematic diagram of one form of a second converter which may be used in the high frequency link standby power supply system of FIG. 5, and FIG. 7b is a schematic diagram of one form of a switch assembly which may be used in the second converter of FIG. 7a;

FIGS. 8a, 8b and 8c are graphs of voltages used to illustrate one mode of operating the second converter of FIG. 7a.

DETAILED DESCRIPTION OF A PREFERRED EMBODIMENT

Figure 1:
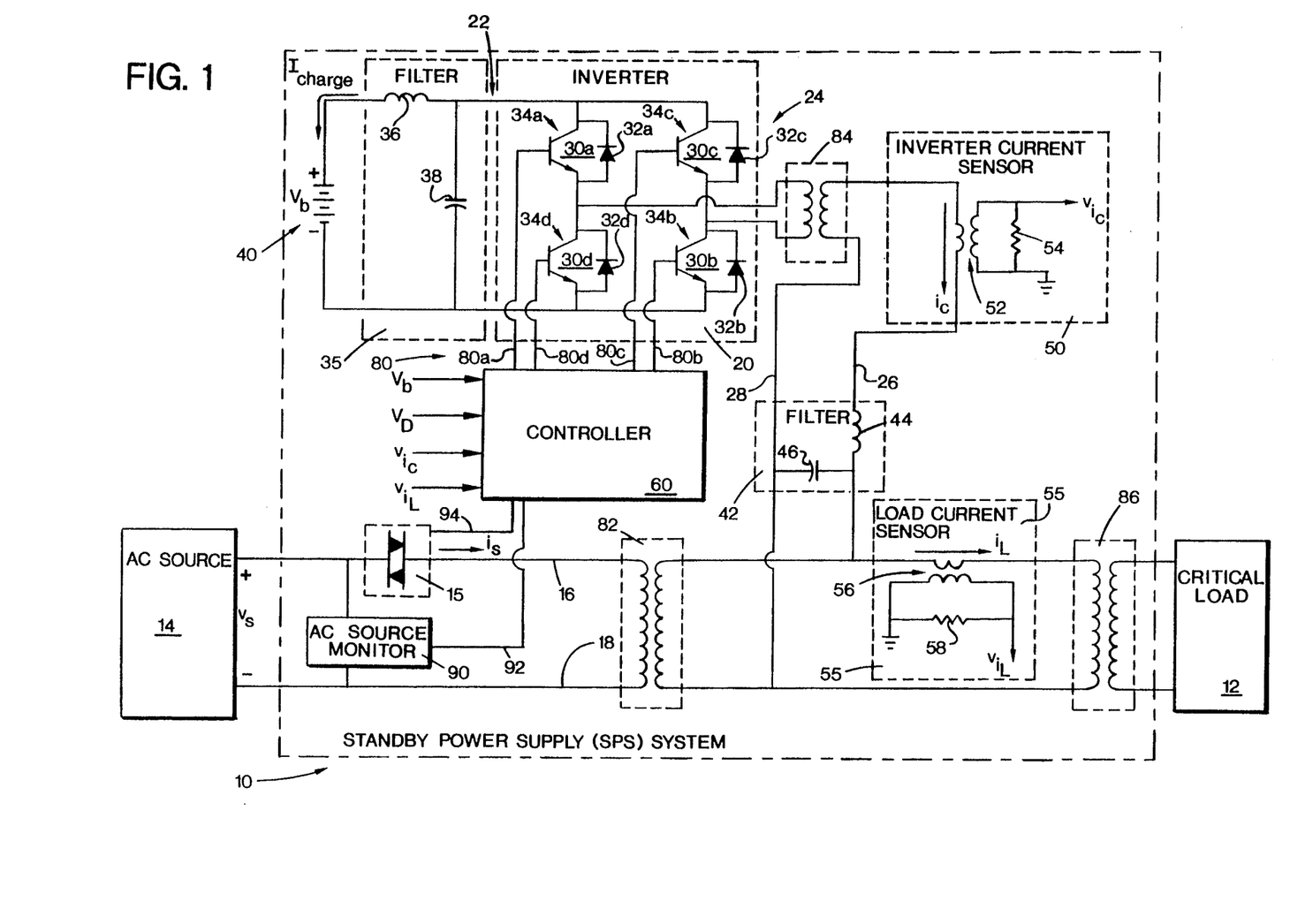
FIG. 1 is a schematic block diagram of one form of a standby power supply system of the present invention.

FIG. 1 illustrates an embodiment of a standby power supply (SPS) system 10 constructed in accordance with the present invention for supplying power to a critical load 12. The SPS system 10 receives AC power from an AC power source 14, such as a utility system. The AC source 14 provides single-phase power at a voltage of $V_s$, such as a nominal rating of 120 volts AC, at the system frequency or line-frequency, such as 60 Hz, and with an AC source current designated $i_s$. An isolation device or switch, such as a bidirectional current semiconductor switch or static interrupter 15, in series with a conductor 16 normally conducts, allowing conductors 16 and 18 to supply AC input power to the critical load 12 from the AC source 14.

The SPS system 10 includes power conversion means, such as a power conversion device which may include an inverter, illustrated as a four quadrant switch-mode inverter 20, for supplying emergency AC power to the load 12 during failure of the AC power source 14. The inverter 20 has a DC side indicated generally as 22, and an AC side indicated generally as 24. Power may flow in either direction through the inverter 20, that is from the AC side 24 to the DC side 22 or vice versa, in a manner described further below. The AC side 24 of the inverter is coupled in parallel with the AC source 14 and the critical load 12 by conductors 26, 28 interconnecting with the respective conductors 16, 18.

The illustrated four quadrant inverter 20 has first, second, third and fourth switch-diode combinations 30a, 30b, 30c and 30d, respectively. Each switch-diode combination has a diode in parallel with a semiconductor switch, such as a transistor. The first switch-diode combination 30a has a diode 32a in parallel with the collector and emitter of transistor 34a; the second combination 30b has a diode 32b in parallel with the collector and emitter of transistor 34b; the third combination 30c has a diode 32c in parallel with the collector and emitter of transistor 34c; and the fourth combination 30d has a diode 32d in parallel with the collector and emitter of transistor 34d. Each transistor 34 turns on in response to a controller signal received by the base of the transistor, allowing current to flow through the transistor.

A first high frequency filter 35, comprising an inductor 36 and capacitor 38, couples the DC side 22 of inverter 20 with a back-up power source, such as battery bank or battery 40. The filter 35 operates as a high frequency filter to remove ripple from the DC waveform supplied by the inverter. A second high frequency filter 42, comprising inductor 44 and capacitor 46, couples the AC side 24 of inverter 20 with the AC source 14 and critical load 12. The second filter 42 removes any unwanted frequencies produced by the inverter, such as those frequencies originating from the switching of transistors 34a, 34b, 34c and 34d.

The SPS system 10 includes harmonic distortion sensor means, such as a harmonic current sensor, for sensing a harmonic distortion current component $i_{dis}$ of the load current $i_L$ (see Equation 1 below). The illustrated harmonic distortion sensor means includes an inverter current sensor 50 located to the inverter AC side 24 of inverter 20. The sensor 50 is of a type which senses the AC inverter current $i_c$ produced by inverter 20. The inverter current sensor includes a transformer 52 having a primary winding in series with conductor 26 and a secondary winding in parallel with a resistor 54. In response to the inverter current $i_c$, the sensor 50 produces an inverter current sensor signal $v_{ic}$ which is the voltage across resistor 54.

In the illustrated embodiment, the harmonic distortion current sensor means also includes a load current sensor 55 located in series with the critical load 12. The sensor 55 is of a type which senses the AC load current $i_L$ drawn by the load 12. The illustrated load current sensor 55 includes a transformer 56 having a primary winding in series with conductor 16 and a secondary winding in parallel with a resistor 58. In response to the load current $i_L$, the sensor 50 produces an inverter current sensor signal $v_{iL}$ which is the voltage across resistor 58. The resistors 54 and 58, as well as transformers 52 and 56, are coordinated to produce sensor signals having the same relative magnitude as the respective associated current signals which the sensors 50 and 55 monitor.

The SPS system 10 has control means, such as a controller 60, for controlling the power conversion means and other functions of the SPS system. The controller 60 may be an analog or digital device, such as a computer, microprocessor or the like. The controller 60 receives the prevailing battery voltage signal $V_b$ from the battery 40, the desired battery voltage level $V_D$ (which may be a preset value), the inverter current sensor signal $v_{ic}$ from the inverter current sensor 50, and the load current sensor signal $v_{iL}$ from the load current sensor 55. The SPS system 10 operates in one manner under normal conditions, that is when the AC source 14 has a source voltage $v_s$ within an acceptable range. Under emergency conditions, when the source voltage $v_s$ collapses, for instance due to a power outage or other failure of the utility system, the SPS system operates in another manner. Normal operation will be discussed first.

A. Normal Operating Conditions

When the AC source voltage $v_S$ from the AC power source 18 is within an acceptable range, the static interrupter 15 in line 16 conducts to allow the source current $i_S$ to flow in both directions. Thus, the source voltage $v_S$ of the AC source 14 is applied across the critical load 12. The load current $i_L$ drawn by the critical load 12 is sensed by the load current sensor 55. The load current $i_L$ comprises two components, a line frequency current component $i_l$ which is at the same frequency as the frequency of the AC source 14, and a harmonic distortion current component $i_{dis}$:

$$i_L = i_l + i_{dis} \quad (1)$$

The distortion current component $i_{dis}$ in Equation (1) comprises harmonics of the fundamental line frequency, such as 60 Hz. The load current sensor 55 produces the load current sensor signal $v_{iL}$ as a voltage signal proportional to the measured load current $i_L$. Therefore:

$$v_{iL} = v_{il} + v_{idis} \quad (2)$$

Figure 2:
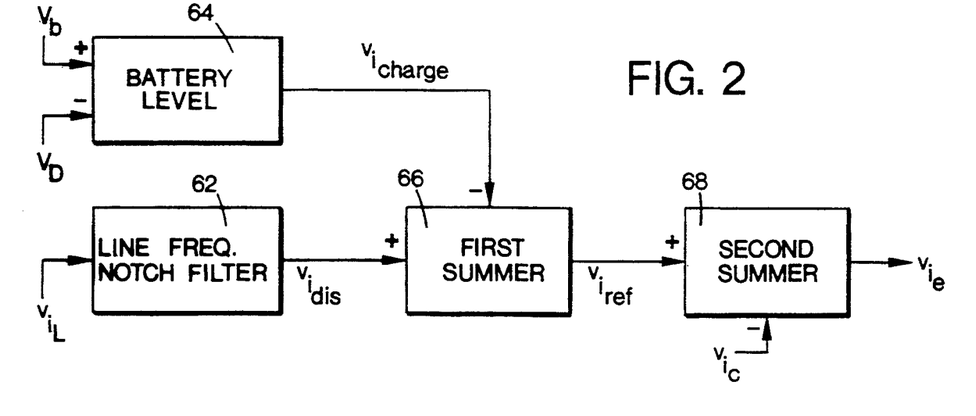
FIG. 2 is a block diagram of one form of a portion of a controller of the standby power supply system of FIG. 1.

Referring to FIG. 2, a portion of controller 60 of FIG. 1 is shown including a line frequency notch filter 62. The notch filter 62 receives the load current sensor signal $V_{iL}$ from the load current sensor 55. The notch filter 62 is sharply tuned to remove a line frequency current component signal $v_{il}$ of Equation (2) which is proportional to the line frequency current component $i_l$ of Equation (1). Thus, the notch filter 62 output signal is essentially the distortion current component signal $V_{idis}$ of Equation (2), which is proportional to the distortion current component $i_{dis}$ of the load current in Equation (1).

Referring to FIG. 1, the inverter 20 supplies a DC charging current $I_{charge}$ to bring the prevailing battery voltage $V_b$ to a desired voltage level $V_D$ (see FIG. 2). This battery charging function may be accomplished in any known conventional manner. For example, using a computer or a microprocessor (not shown), the prevailing battery voltage $V_b$ may be compared with a list in a look-up table electronically stored therein to determine the charging current $I_{charge}$ required to bring the prevailing battery voltage $V_b$ to the desired voltage level VD, for example, 200 volts DC. This 200 $V_{DC}$ rating advantageously provides an emergency inverter AC output for the SPS system 10 which matches the 120 $V_{AC}$ power normally provided by the utility AC source 14.

To accomplish this function, the controller 60 may include a battery voltage level governing device 64. However, it is apparent that the governing device 64 could also be a device separate from controller 60. Preferably, the governing device 64 is of a type which senses a prevailing battery voltage $V_b$ and determines therefrom the charging current $I_{charge}$. The governing device 64 also provides a battery charging current sensor signal $v_{icharge}$ which is proportional to the required charging current $I_{charge}$, with the proportionality as referred to the AC side 24 of the inverter being the same as that provided by the load current sensor 55.

As mentioned above, the critical load 12 produces undesirable current harmonics which can adversely affect the AC source 14 and other loads also receiving power from the AC source 14. To neutralize these undesirable current harmonics, controller 60 controls the inverter 20, as described further below, to supply a harmonics neutralizing current of the same amplitude but opposite polarity to that of the distortion current component $i_{dis}$ of the load current in Equation (1).

Additionally, the inverter 20 charges the battery bank 40 with the DC charging current $I_{charge}$, which may be referred to the inverter AC side 24 as a charging current $i_{charge}$. Thus, the inverter 20 provides an inverter current $i_c$ at the AC side 24 which equals the sum of the distortion current component and the charging current. That is, $i_c = i_{dis} - i_{charge}$, where the direction of the charging current referred to the AC side 24 of the inverter, $i_{charge}$, is assumed to be positive into the AC side 24 of the inverter 20. The charging current $i_{charge}$ is assumed sinusoidal, in phase, and at the same frequency as the AC source voltage $v_s$ to make the equations herein mathematically correct, that is, with the voltage and current having the same frequency and being in phase.

The inverter 20 is forced by controller 60 to provide an inverter current $i_c$ substantially equal to a desired inverter current or reference current $i_{ref}$, which may be written as:

$$i_{ref} = i_{dis} - i_{charge} \quad (3)$$

The amplitude of the charging current $i_{charge}$ depends upon the charge state of the battery bank 40 as determined by governing device 64 from the prevailing and desired battery voltages $V_b$ and $V_D$, respectively.

Referring again to FIG. 2, the controller 60 has a first summer 66 which receives the charging current sensor signal $v_{icharge}$ the battery level governing device 64. The first summer also receives the distortion current component signal $V_{idis}$ from the notch filter 62. The summer 66 removes the charging current sensor signal $v_{icharge}$ from the distortion current signal $v_{idis}$ by adding $v_{icharge}$ with a negative polarity to $v_{idis}$ to provide a reference current signal $v_{iref}$, that is:

$$v_{iref} = v_{idis} - v_{icharge} \quad (4)$$

In Equation (4), the reference current signal $v_{iref}$ is proportional to the reference current $i_{ref}$ of Equation (3).

To instantaneously force the inverter current $i_c$ of FIG. 1 to be equal to the reference current $i_{ref}$ of Equation (3), the inverter current sensor 50 monitors the sensor inverter current $i_c$. In response to the sensed inverter current $i_c$, the sensor 50 produces the inverter current sensor signal $v_{ic}$. The sensor signal $V_{ic}$ is proportional to the inverter current $i_c$ with the same proportionality of that provided by the load current sensor 55 and the battery level governing device 64.

The controller 60 has a second summer 68 shown in FIG. 2 which receives the reference current signal $v_{iref}$ from the first summer 66. The second summer 68 also receives the inverter current sensor signal $v_{ic}$ from the sensor 50. The second summer 68 removes the inverter current signal $V_{ic}$ from the reference current signal $v_{iref}$ by adding $v_{ic}$ with a negative polarity to $v_{iref}$ to produce an output signal comprising an error signal $v_{ie}$, that is:

$$v_{ie} = v_{iref} - v_{ic} \tag{5}$$

The error signal $v_{iref}$ is proportional to the error between the reference current $v_{ref}$ and the inverter current $i_c$.

The controller 60 uses the error signal $v_{ie}$ produced by summer 68 to produce an inverter control signal 80 to control inverter 20 by controlling the switching of the transistors 34a-34d. There are a variety of sophisticated approaches which are suitable to control the illustrated switch mode inverter 20. In one simplified approach, the transistors 34a and 34b are operated as a first group of switches, while the transistors 34c and 34d are operated as a second group of switches. The two switches in each group are turned on or turned off simultaneously. For this type of inverter operation, two types of inverter control are illustrated, with one being a tolerance band control system and the other a fixed frequency control system.

Figure 3:
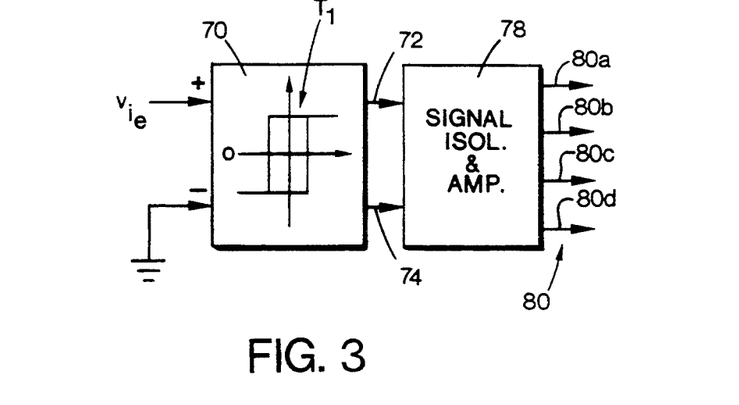
FIG. 3 is a block diagram of one form of another portion of the controller of the standby power supply system of FIG. 1.

For the tolerance band control system shown in FIG. 3, the controller 60 includes a tolerance band controller, such as a comparator 70. The comparator 70 includes a tolerance or hysteresis band $T_1$ (illustrated schematically in FIG. 3). The comparator 70 compares the error signal $v_{ie}$ with the values defined by the tolerance band $T_1$. If the value of the error signal exceeds the tolerance band $T_1$, the status of the inverter transistors 34a-34d is changed depending on the polarity of the error signal $v_{ie}$. The output of the tolerance band controller 70 comprises first and second gate signals 72 and 74.

Figure 4:
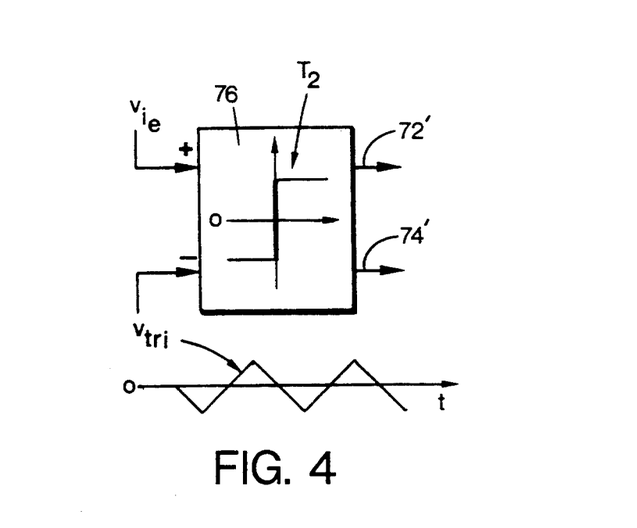
FIG. 4 is a block diagram of an alternate to a portion of the diagram shown in FIG. 3.

Alternatively, the inverter control signal 80 may be produced by controller 60 having a fixed frequency controller, such as a comparator 76 shown in FIG. 4. The comparator 76 receives the error signal $v_{ie}$ from the second summer 68. The comparator also receives a triangular waveform signal $v_{tri}$ having a constant amplitude and preferably a fixed frequency. The comparator 76 has a very small hysteresis or tolerance band $T_2$ (when compared to $T_1$) which is mainly used to provide a noise immunity to the output current of inverter 20. Noise immunity refers to the tendency of a switching device, such as the transistors of inverter 20, to undesirably change state in response to noise in the control signal, instead of changing state at the desired time established by controller 60.

The comparator 76 subtracts the triangular waveform $v_{tri}$ as indicated by the minus sign, from the error signal $v_{ie}$ to provide a resulting difference signal. The comparator compares this difference signal with the tolerance band $T_2$ to detect and determine the polarity of the difference signal. When this resulting value exceeds the tolerance band $T_2$, the transistors 34a-34d change state, depending upon the polarity of the resultant value, to bring the difference signal within the tolerance band $T_2$. Thus, the frequency of the triangular waveform $v_{tri}$ establishes an inverter switching frequency at which the transistors 34a-34d respond. The fixed frequency controller 76 provides alternate first and second gate signals 72' and 74' to those provided by the tolerance band controller of FIG. 3. In this manner, the inverter current $i_c$ is driven to follow the reference current $i_{ref}$ to adequately charge the battery bank 40 and to substantially neutralize the undesirable harmonic load currents.

The controller 60 also includes signal conditioning means, such as the conventional signal isolation and amplification device or signal conditioner 78 illustrated in FIG. 3. The signal conditioner 78 receives the first and second gate signals 72, 74 from the tolerance band controller comparator 70 in the embodiment of FIG. 3. Alternatively, if the fixed frequency controller comparator 76 of FIG. 4, is used, the alternate first and second gate signals 72' and 74' are received and conditioned by the signal conditioner 78.

From the first and second gate signals (72, 74 or 72', 74'), the signal conditioner 78 provides the inverter control signal 80, comprising transistor drive signal components or gate signals 80a, 80b, 80c and 80d. The gate signals 80a, 80b, 80c and 80d are received by the bases of the respective transistors 34a, 34b, 34c and 34d of the inverter 20. Thus, the error signal $v_{ie}$ of Equation (5) is used by the controller 60 to generate the inverter control signal 80. There are several ways to generate the gate signals 80a-80d which may be found in a variety of textbooks, such as the book, *Power Electronics: Converters, Applications and Design*, by Mohan, Robbins and Undeland, John Wiley Publisher, 1989.

To control the inverter current $i_c$ and force it to be substantially equal to the reference current $i_{ref}$, it is preferable that the desired DC voltage $V_D$ of the battery bank 40 be greater than the peak value of the AC source voltage $v_s$ of the AC source 14 by a given margin. For example, this margin may be 10% of the peak value of the AC source voltage $v_s$ maximum value, such as five percent over the rated source voltage $v_s$. This margin advantageously assists in controlling the inverter current $i_c$ to follow the reference current $i_{ref}$ by providing a higher voltage to the inverter side of the filter capacitor 46 than across the AC source and load side of capacitor 46.

Referring again to FIG. 1, the high frequency filter 35 to the DC side 22 of inverter 20 bypasses the high frequency current components or ripple from inverter 20 around the battery bank 40. Thus, the battery bank 40 does not receive these high frequency current components. The high frequency filter 42 on the inverter AC side 24 prevents the high switching frequency currents produced by inverter 20 from being applied to the critical load 12 and the AC source 14. However, any waveform distortion of the power received from the AC source 14 may also be experienced by the load 12.

The inductance of the filter inductor 44 influences the switching frequency for a selected tolerance band $T_1$ or $T_2$. The lower the inductance of the filter inductor 44, the faster the switching may occur as known from the familiar equation, $v = (L)(di/dt)$. Referring to FIG. 3, the inductance of inductor 44 directly influences the switching frequency of the tolerance band controller 70. This is true since the switching frequency for controller 70 is not constant, and switching only occurs when the error signal $v_{ie}$ exceeds the band $T_1$. Referring to FIG. 4, the inductance of inductor 44 only influences the switching frequency ripple of the inverter current $i_c$ in the fixed frequency controller 76 for a selected switching frequency. This follows since the switching frequency of controller 76 is the frequency of the triangular waveform $v_{tri}$. The transistors 34a–34d change state when the tolerance band $T_2$ is exceeded by the difference between the error signal $v_{ie}$ and the triangular waveform $v_{tri}$.

Referring back to FIG. 1, optionally the SPS system 10 may also include plural isolation transformers, each operating at the system frequency of the AC power source 14. For example, a first isolation transformer 82 may be located across conductors 16 and 18 between the AC source 14 and the inverter 20. A second isolation transformer 84 may be located across lines 26 and 28 between the inverter 20 and the inverter current sensor 50. A third isolation transformer 86 may be located across conductors 16 and 18 between the load current sensor 55 and the load 12.

B. Emergency Operating Conditions

During an emergency condition, the source voltage $v_s$ collapses due to some failure of the AC source 14. The SPS system 10 may include source monitoring means, such as an AC source monitor 90 connected in parallel with the AC source 14 across conductors 16 and 18. When $v_s$ collapses below a predetermined acceptable value, for example, eighty percent of the rated voltage, the monitor 90 detects this failure. The monitor 90 may also include conventional hysteresis or a deadband to accommodate momentary faults in the AC source 14 without causing the SPS system 10 to enter an emergency mode of operation. While the monitor 90 is shown as an independent component, it is apparent that the source monitoring means may be incorporated within the static interrupter 15 or within the controller 60.

When an AC source failure is detected by the monitor 90, an AC source failure signal 92 is delivered to the controller 60. The controller 60 controls the static interrupter 15 with a static interrupter control signal 94 which comprises a disconnect signal when the AC source fails. In response to the disconnect signal, the static interrupter 15 turns-off to disconnect and isolate the SPS system 10 and load 12 from the AC source 14. Alternatively, the monitor 90 may send a disconnect signal (not shown) directly to the static interrupter 15. The controller 60 then controls the inverter 20 in a conventional manner as a conventional pulse width modulated (PWM) inverter operating in a voltage mode. In this fashion, the inverter 20 supplies AC emergency power having a nearly sinusoidal voltage to the critical load 12, using power supplied by the battery bank 40.

C. Operation

In operation, the SPS system 10 operates in two modes, with one being under normal operating conditions, and the other being under emergency operating conditions. From the following discussion, a method of supplying AC power to the load 12 during both of these conditions is also covered.

During normal operating conditions, using an SPS system 10 which may be as described above, the static interrupter 15 conducts to couple the AC power source 14 with the SPS system 10 and with the critical load 12. The load current $i_L$ supplied to the load 12 is sensed with the load current sensor 55 which produces in response thereto the load current sensor signal $V_{iL}$. The notch filter 62 removes the line frequency component $i_1$ supplied by the AC source 14 from the load current $i_L$ to provide the distortion current signal $v_{idis}$, corresponding to the undesirable load current harmonic components $i_{dis}$ (see Equations 1 and 2). The inverter 20 draws power from the AC source 14 and produces the inverter current $i_c$ in response to the inverter control signal 80 received from controller 60. The inverter current sensor 50 senses the inverter current $i_c$ and produces in response thereto the inverter current sensor signal $v_{ic}$.

The controller 60 controls the inverter 20 in response to the inverter current sensor signal $v_{ic}$ and the load current sensor signal $v_{iL}$ by producing the inverter control signal 80, as described further below, to substantially neutralize the undesirable harmonic currents produced by the load 12. The controller 60 controls the inverter 20 to force the inverter current $i_c$ to be equal to the reference current $i_{ref}$. Referring to Equation (3), the reference current $i_{ref}$ includes the harmonic current distortion component $i_{dis}$ and the battery charging current component $I_{charge}$, referred to the inverter AC side 24 as $i_{charge}$. The charging current is sensed and controlled by the battery voltage governing device 64 which in response thereto produces the charging current sensor signal $v_{icharge}$.

The first summer 66 of controller 60 produces the current reference signal $v_{iref}$ by removing the charging current sensor signal $v_{icharge}$ from distortion current signal $v_{idis}$ by adding $v_{icharge}$ with a negative polarity to $v_{idis}$. The second summer 68 produces the error current signal $v_{ie}$ by removing the inverter current sensor signal $v_{ic}$ from the current reference signal $v_{iref}$ by adding $v_{ic}$ with a negative polarity to $v_{iref}$.

The controller 60 may be provided with either the tolerance band controller 70 of FIG. 3 or with the fixed frequency controller 76 of FIG. 4. When the tolerance band controller 70 is used, the method of the present invention may also include the steps of comparing the error current signal $v_{ie}$ from the second summer 68 with the tolerance band $T_1$. In a changing step, the inverter control signal 80 is varied by the controller 60 to return the error current signal $v_{ie}$ to a value within the tolerance band $T_1$ when $v_{ie}$ exceeds band $T_1$.

For a controller 60 provided with the fixed frequency controller 76 of FIG. 4, the method of the present invention may also include the steps of providing the triangular waveform signal $v_{tri}$ to the controller 76. Preferably, the $v_{tri}$ signal is provided at a constant amplitude and frequency. The constant triangular waveform signal frequency is used for establishing an inverter switching frequency for the inverter control signal 80. The controller 76 compares the error current signal to the $v_{ie}$ with the triangular waveform signal $v_{tri}$ to provide a difference signal. The comparator 76 determines and detects the polarity of the difference signal by comparing it with the tolerance band $T_2$. In response to the difference signal of comparator 76, the controller 60 changes the inverter control signal 80 to return this different signal to within the tolerance band $T_2$.

The signal conditioner 78 receives and conditions the first and second gate signals, 72 and 74 from tolerance band controller 70, or alternatively 72' and 74' from the fixed frequency controller 76. From these gate signals, the conditioner 78 provides the transistor drive signals 80a–80d of the inverter control signal 80 to drive the inverter transistors 34a–34d. The controller 60 changes the drive signals 80a–80d to maintain an adequate charge on battery bank 40 while substantially neutralizing undesirable harmonic currents produced by the load 12.

In this manner, a sinusoidal current is drawn from the AC source 14. Any harmonic currents required by the load 12 are neutralized by the SPS system 10 which supplies harmonic distortion current components of the same magnitude but opposite polarity of the load current harmonics. Advantageously, other loads in the vicinity supplied by the AC source 14 are not adversely affected by the harmonic current distortion of the load 12. The SPS system 10 has fewer components than many known UPS and SPS systems, and thus, suffers fewer component failures. The control system of controller 60 may be implemented by analog, digital or microprocessor techniques.

During emergency operating conditions, when $v_s$ collapses due to a utility outage of source 14, the static interrupter 15 isolates the SPS system 10 and load 12 from the AC source 14. The controller 60 then controls the inverter 20 as a conventional pulse width modulated (PWM) inverter operating in a voltage mode. In this fashion, the battery bank 40 supplies power through the inverter 20 to the critical load 12 to maintain load operation during the emergency.

An Alternate Preferred Embodiment

FIGS. 5 through 9 illustrate an alternate embodiment of a standby power supply (SPS) system comprising a high frequency (HF) link SPS system 100 constructed in accordance with the present invention. The HF-link SPS system 100, as described further below, has several advantages over the embodiment of FIGS. 1–4. For example, the HF-link SPS system 100 may be used with a battery having a lower DC bus voltage level rating than that of the FIG. 1 embodiment. This lower DC bus voltage is safer for repair personnel to work around and provides higher battery reliability. Furthermore, a lower EMI (electromagnetic interference) may be realized using this embodiment, as described further below. Also, the HF-link SPS system 100 may run quieter since it is capable of operation at a frequency above the audible frequency range.

Figures 5, 7A, 7B, 8A, 8B, 8C:
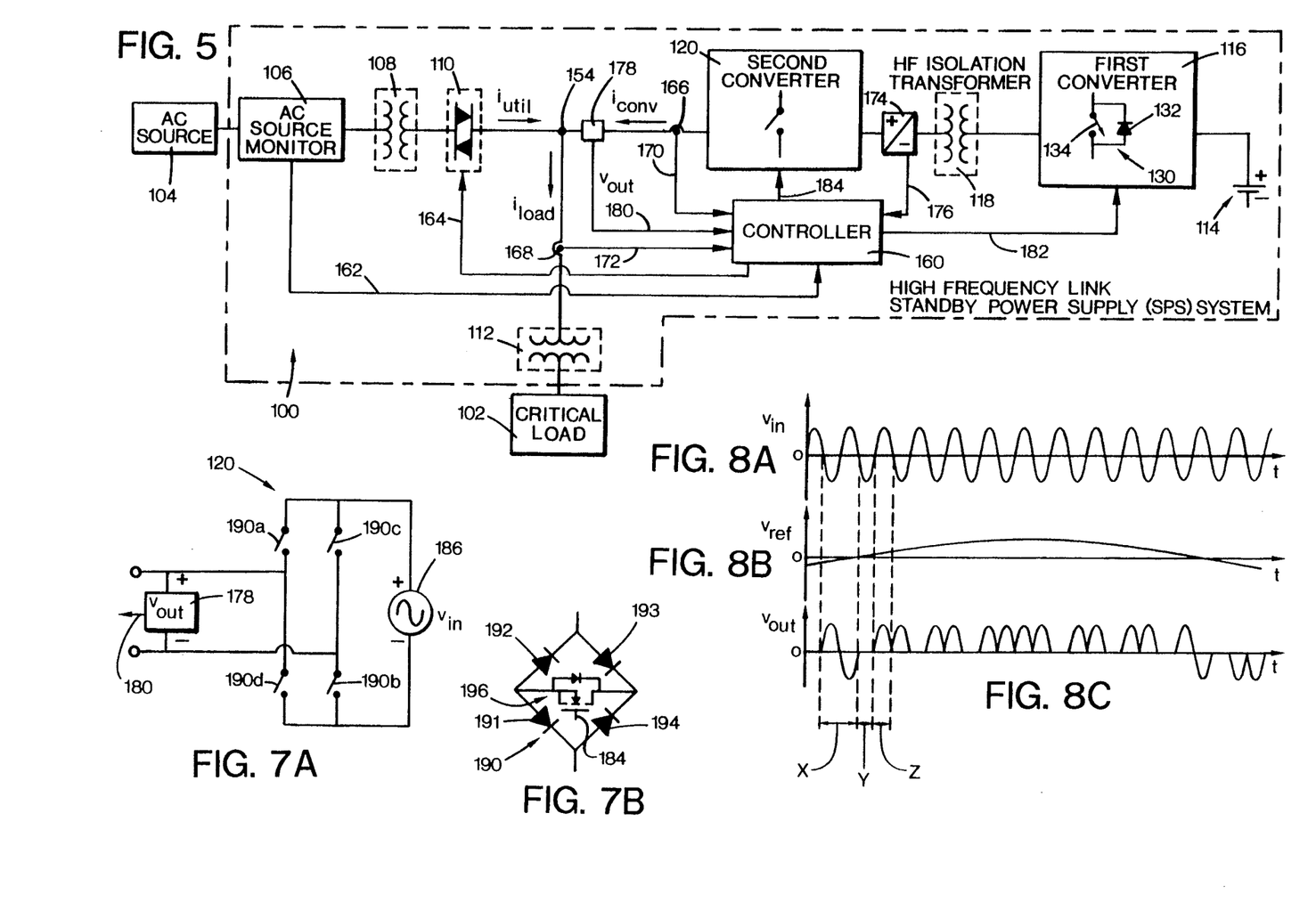

The HF-link SPS system 100 supplies power to a critical load 102, which may be as described above for the critical load 12 of FIG. 1. The HF-link SPS system 100 receives AC power from an AC power source 104, which may be as described above for AC power source 14. The HF-link SPS system 100 includes an AC source monitor 106, which may be as described above for the AC source monitor 90, to monitor the power received from the AC source 104 and to facilitate the transition between normal and emergency operating conditions.

An optional isolation transformer 108 operating at the system frequency of the AC source 104 may be included. An isolation device or switch, such as a static interrupter 110, which may be as described above for interrupter 15, normally conducts to supply power to the critical load 102. Another isolation transformer 112, also operating at the system frequency, may be included to provide protection between the HF-link SPS system 100 and the critical load 102.

The HF-link SPS system 100 has a backup power source, such as a battery bank or battery 114. In this embodiment, the battery 114 may advantageously may be rated at a lower DC voltage than the battery bank 40 of FIG. 1. For example, battery bank 40 may be rated at a desired voltage on the order of 200 $V_{DC}$, whereas battery 114 may be rated on the order of 48 $V_{DC}$.

The battery 114 is coupled to the AC source 104 and critical load 102 by power conversion means, such as a power conversion device including a first converter 116, a high frequency (HF) isolation transformer 118, and a second converter 120. The power conversion means includes a high frequency (HF) link, comprising the interface of the first and second converters 116 and 120. This power conversion means and the battery 114 are shown in more detail in FIG. 6, which includes a plurality of filters omitted for simplicity from FIG. 5.

Figure 6:
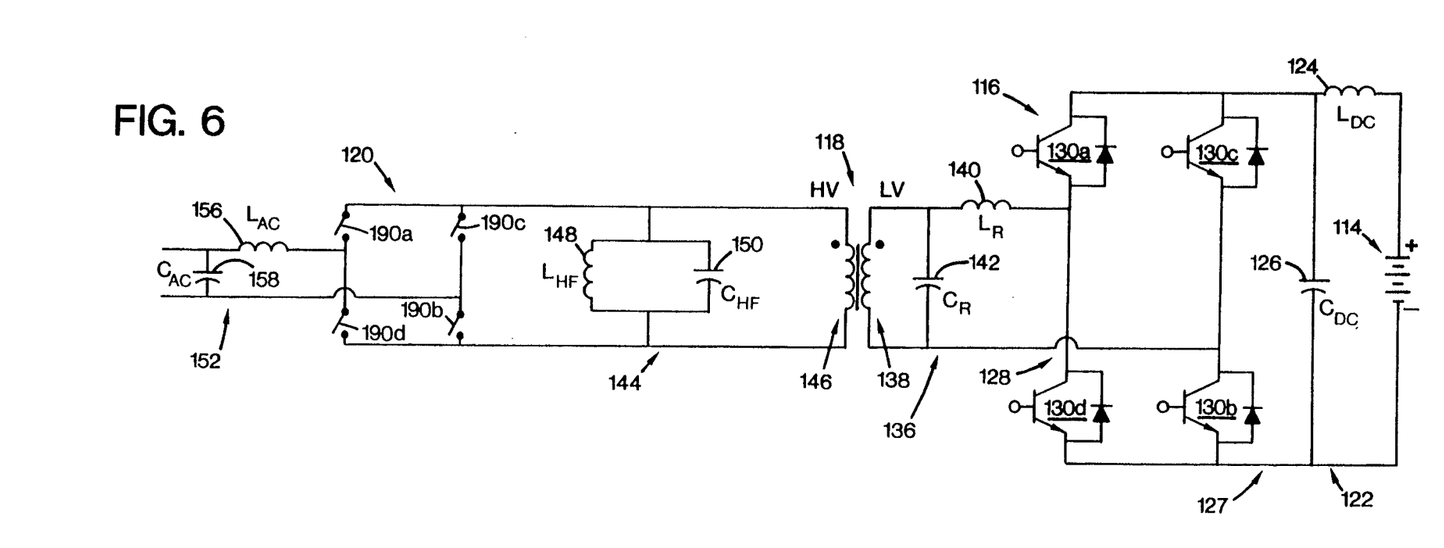
FIG. 6 is a schematic diagram of a portion of the high frequency link standby power supply system of FIG. 5.

Referring to FIG. 6, a DC filter 122 couples the battery 114 with the first converter 116. The DC filter 122 includes an inductor 124 having an inductance $L_{DC}$, and a capacitor 126 having a capacitance $C_{DC}$. The filter 122 may operate as described above for filter 35 to remove ripple from the DC waveform supplied by the first converter 116 to charge the battery 114.

The first converter 116 is illustrated as a switch-mode converter having a DC side 127 and an AC side 128. The power flow through converter 116 is bidirectional, that is from the AC side 128 to the DC side 127 and vice versa. In the illustrated embodiment, the converter 116 may be constructed as described above for the inverter 20 but operated according to a different manner of control. The illustrated converter 116 has identical first, second, third and fourth switch-diode combinations 130a, 130b, 130c and 130d, respectively. For example, the first switch-diode combination 130a has a diode 132a in parallel with a semiconductor switch, such as a transistor 134a, with the collector and emitter of transistor 134a being in parallel with diode 132a. In the illustrated embodiment, the item numbers of the switch-diode combinations, diodes and transistors for converter 116 are one hundred more than the item numbers of the switch-diode combinations, diodes and transistors, respectively, for inverter 20.

A resonant tank 136 couples the AC side 128 of converter 116 with a low voltage side 138 of the HF-isolation transformer 118. The resonant tank 136 includes an inductor 140 having an inductance $L_R$, and a capacitor 142 having a capacitance $C_R$. The HF-link may be chosen to operate at a high link frequency $f_{HF}$, for example 20 kHz, which is established by the switching frequency of the first converter 116. Preferably, the converter 116 operates at a 0.5 duty-ratio. This configuration provides a high frequency AC voltage across the low voltage side 138 of transformer 118. The resonant frequency $f_0$ of the resonant tank 136 is:

$$f_0 = \frac{1}{2\pi \sqrt{L_R C_R}}$$

The components and variables of the system may be chosen such that the first converter 116 operates at a link frequency $f_{HF}$ greater than the resonant frequency $f_0$, i.e., $f_{HF} > f_0$.

A high frequency (HF) link filter 144 couples a high voltage side 146 of transformer 118 with the second converter 120. The filter 144 includes an inductor 148, having an inductance $L_{HF}$, in parallel with a capacitor 150 which has a capacitance $C_{HF}$. The components of the HF-link filter 144 may be chosen such that filter 144 is parallel resonant at the frequency $f_{HF}$ established by the first converter 116. That is:

$$f_{HF} = \frac{1}{2\pi \sqrt{L_{HF}C_{HF}}}$$

The advantages of these particular selections will be described below.

A third filter 152 may be included between the second converter 120 and a parallel junction 154 (see FIG. 5) of the second converter 120 with the critical load 102 and the input from the AC source 104. The filter 152 includes an inductor 156 having an inductance $L_{AC}$, and a capacitor 158 having a capacitance $C_{AC}$. The filter 152 operates as described above for filter 42 to remove any unwanted frequencies produced by the second converter 120.

Referring again to FIG. 5, the HF-link SPS system 100 has control means, such as a controller 160, for controlling the power conversion means and other functions of the system. For example, the controller 160 receives an AC source monitor signal 162 from the AC source monitor 106, and in response thereto controls the static interrupter 110 with a static interrupter control signal 164. This manner of monitoring the AC source 104 and controlling the interrupter 110 may be as described above with respect to controller 60, monitor 90 and interrupter 15.

The HF-link SPS system 100 has harmonic distortion sensor means for sensing a harmonic distortion current component of a load current $i_{load}$ drawn by the critical load 102 during normal operating conditions. For simplicity, the various sensor means of the illustrated embodiment are shown in FIG. 5 and omitted from FIG. 6. In the illustrated embodiment, the harmonic distortion sensor means comprises converter current sensor means, such as an inverter current sensor 166, and load current sensor means, such as a load current sensor 168. The converter current sensor 166 senses an output current $i_{conv}$ of the second converter 120 supplied to the parallel junction 154. The load current sensor 168 senses the load current $i_{load}$. The converter current sensor 166 provides a converter current sensor signal 170 to controller 160, and the load current sensor 168 provides a load current sensor signal 172 to the controller 160. The converter and load current sensors 166 and 168 may be as described above for the respective inverter and load current sensors 50 and 55.

Another input to the controller 160 is provided by polarity sensor means, such as a polarity sensor 174, for sensing the polarity on the high voltage side 146 of the HF-isolation transformer 118. The polarity sensor 174 provides a high frequency polarity sensor signal 176 to the controller 160. The polarity sensor 174 is useful in determining the zero-crossings of the high frequency voltage received by the second converter 120 from the transformer 118.

The converter 120 has a bidirectional power flow therethrough, and the voltages on each side of the second converter 120, that is toward the parallel junction 154 and toward transformer 118, are bipolar or alternating in nature. Although the power flow is clearly bidirectional, the output of converter 120 toward the parallel junction 154 is described herein as an output voltage $V_{out}$ and an output current $i_{conv}$. For sensing the second converter output voltage $v_{out}$, converter output voltage sensor means, such as a converter output voltage sensor 178, are provided. In the illustrated embodiment, sensor 178 provides a sensor signal 180 having magnitude, frequency and polarity information about the output voltage $V_{out}$. It is apparent that in some embodiments the high frequency polarity sensor 174 may be as described for the output voltage sensor 178.

For the purposes of discussing the illustrated embodiment, the second converter 120 is described as having the output current and voltage, $i_{conv}$ and $v_{out}$, provided to the parallel junction 154. However, the bidirectional operation of converter 120 is used in conjunction with the first converter 116 to charge the battery 114 during normal operation. The output current and voltage, $i_{conv}$ and $v_{out}$, are useful in describing both emergency operation of the HF-link SPS system 100 and normal operation, wherein the power conversion means produces a harmonics neutralizing current in a manner described further below.

In response to the inputs described above, the controller 160, which may be as described above for controller 60, controls the first converter 116 with a first converter control signal 182. Signal 182 comprises four transistor drive signal components or gate signals 182a, 182b, 182c and 182d for controlling the switching of transistors 134a, 134b, 134c and 134d, respectively. The controller 160 also controls the second converter 120 with a second converter control signal 184. Signal 184 comprises four switching control signals 184a, 184b, 184c and 184d for controlling the second converter as described further below.

A suitable construction and manner of operating the second converter 120 is illustrated in FIGS. 7A–7B and 8A–8C. In FIG. 7A, the voltage received by converter 120 from the HF-isolation transformer 118 is illustrated schematically as an AC voltage source 186 providing an input or link voltage $v_{in}$. The converter 120 includes four switch assemblies 190a, 190b, 190c and 190d arranged in a bridge configuration and illustrated schematically in FIGS. 6 and 7A. Bidirectional power flow through the second converter 120 may be accomplished by using bidirectional current switches. For example, two unidirectional switches may be connected with reverse blocking capability in antiparallel.

A simpler way to obtain a bidirectional-current switch with voltage blocking capability of both polarities is illustrated as switch assembly 190 in FIG. 7B, suitable for each switch assembly 190a through 190d. The switch assembly 190 includes four diodes 191, 192, 193 and 194 interconnected as shown with a single switch, such as a MOSFET 196. The MOSFET switch 196 turns on (conducts) in response to the appropriate one of the components of the second converter control signal 184, e.g., switch assembly 190a having a MOSFET 196a (not shown) would operate in response to the second converter control signal 184a. In this manner, the second converter 120 may provide an interface between the high frequency AC voltage from transformer 118 and the sinusoidal line frequency (e.g., 60 Hz) voltage of the AC source 104.

To produce a desired output voltage $V_{out}$, the second converter may be operated in a variety of different ways. For example, the converter 120 may be operated in an integral-half cycle mode as described in NASA Contractor Report No. 179600, prepared for the Lewis Research Center under Grant No. NAG3-631, entitled "Study of Generator/Motor Operation of Induction Machines in a HF-link Space Power System," by T. A. Lipo and P. K. Sood, published in March 1987. The substance of the applicable points from the NASA report are covered in a 1987 APEC/IEEE publication by P. K. Sood, T. A. Lipo, and I. G. Hansen entitled "A Versatile Power Converter for HF-Link Systems," pp. 249–56.

In the integral-half cycle mode, the switches 190a–190d of converter 120 are turned on or off when the link voltage $V_{in}$, represented by source 186, passes through zero, that is, when there is a zero-crossing of the voltage waveform. The zero-crossings of the waveform of the link voltage $v_{in}$, shown in FIG. 8A, are detected by the high frequency polarity sensor 174 (see FIG. 5). For each cycle of the HF-isolation transformer 118, the link voltage crosses through zero twice per cycle. Switching losses are advantageously reduced by switching the switches 190a through 190d of the converter 120 at the zero-crossing points. In this manner, switching losses are minimized and the required current handling capability of each switch assembly 190 is reduced. This advantageously allows for minimizing the size of the switch assemblies used, thus providing a more economical HF-link SPS system 100. Furthermore, switching related device voltage stresses may also be minimized with this approach, increasing the reliability of the HF-link SPS system 100.

A low-frequency AC voltage, e.g., the line frequency of 60 Hz, may be synthesized with a modulation scheme based on an area comparison concept, often called the area-compensation pulse-density-modulation (AC-PDM) method. For illustration, a desired sinusoidal output voltage or reference signal $V_{ref}$ is shown in FIG. 8B. In the AC-PDM method, the area under the waveform of the reference signal $v_{ref}$ is compared by controller 160 (as described further below) with the area under the synthesized signal, that is the waveform of the converter output voltage $v_{out}$, shown in FIG. 8C. In response to this comparison, the next half cycle of the $v_{out}$ waveform is moved above or below the zero reference or not allowed to pass through the converter at all, so the area under the $v_{out}$ waveform follows the area under the reference $v_{ref}$ waveform. Thus, the density of the half cycle pulses in the synthesized output voltage $v_{out}$ is modulated in close accordance with the amplitude of the reference signal $V_{ref}$ shown in FIG. 8B.

The converter 120 is controlled in the following fashion by the second converter control signal 184 to provide the desired waveform of the output voltage $v_{out}$. Referring to FIG. 8C, the $v_{out}$ waveform during the interval marked X is provided by driving switch assemblies 190c and 190d to be turned-on to conduct during this cycle. The $v_{out}$ waveform during the interval labelled Y is provided by driving switches 190a and 190c to conduct, or alternatively by driving switches 190b and 190d to conduct. The $v_{out}$ waveform during the interval Z is provided by driving switches 190a and 190b to conduct. It is clear that this method may be used with non-sinusoidal input waveforms $v_{in}$ received from transformer 118, such as a square wave.

During normal operation, the controller 160 has a portion, which may be identical to that shown and described above in FIG. 2 for controller 60, used for operation in a current mode. For example, the battery level governing device 64 may monitor the voltage level of battery 114 to supply the input $V_b$ to the battery level governing device 64. The load current sensor signal 172 is supplied to the line frequency notch filter 62 as $v_{iL}$. Similarly, the second converter output current sensor signal 170 is supplied to the second summer 68 as the signal $v_{ic}$. Thus, the second summer 68 may supply an error signal $v_{ie}'$, which is distinguished from the error signal of the FIG. 1 embodiment by the addition of the prime (') designator.

Figure 9:
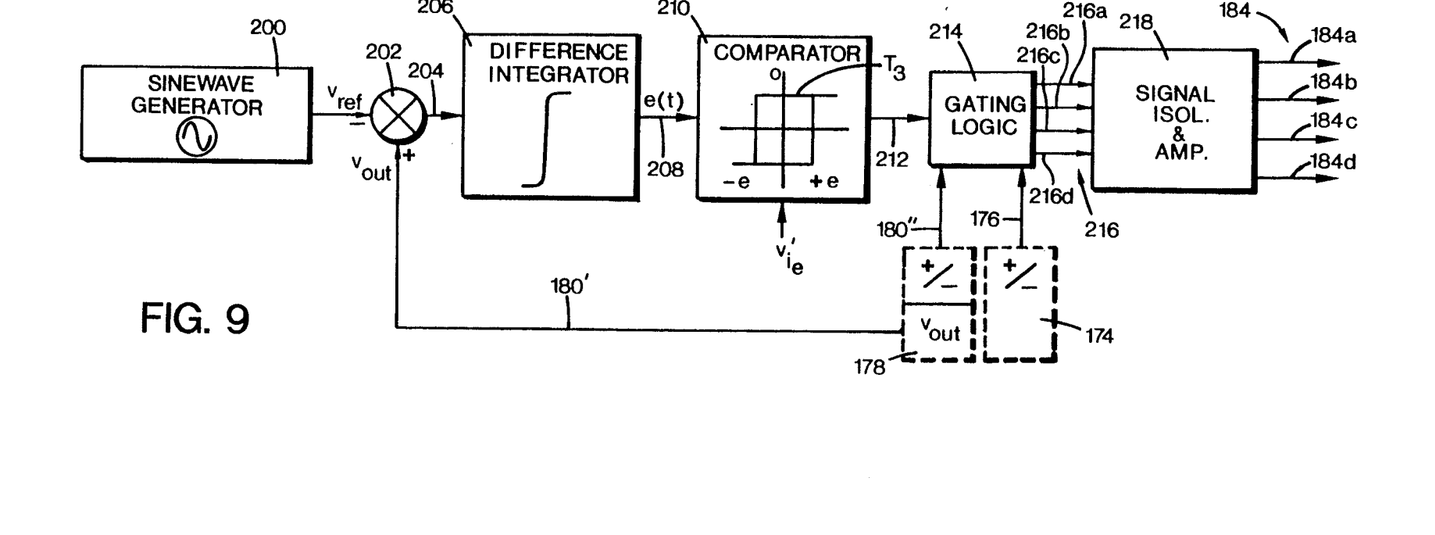
FIG. 9 is a block diagram of one form of a portion of a controller of the high frequency link standby power supply system of FIG. 5.

During emergency operation, the HF-link SPS system 100 operates in a voltage mode. One manner of generating the second converter control signal 184 is illustrated in FIG. 9, which shows a portion of the controller 160. A sinewave generator 200 generates the reference voltage signal $v_{ref}$ shown in FIG. 8B. The controller 160 includes a summer 202 which adds the reference voltage signal $v_{ref}$ with a negative polarity to an amplitude portion 180' of the converter output voltage signal 180. From this summation, the summer 202 provides a difference signal 204 to a difference integrator 206. The integrator 206 integrates the difference signal 204 to provide an area error signal e(t), also designated as 208. A tolerance band control scheme as described above with respect to FIG. 3 is used by comparator 210, which may be as described above for comparator 70, having a tolerance band $T_3$. When the area error signal 208 exceeds the tolerance band $T_3$, the comparator 210 provides a change area signal 212 to a gating logic device 214. The change area signal 212 may be an increase, decrease, or a hold-constant area signal. The gating logic device 214 decides which combinations of the switch assemblies 190a through 190d must be turned on such that the area under the $v_{out}$ waveform (FIG. 8C) synthesizes the area under the reference $v_{ref}$ waveform (FIG. 8B). These switching combinations are described above with reference to intervals X, Y and Z.

To assure switching of the converter 120 occurs at zero crossings of the voltage received from transformer 118 ($v_{in}$ of source 186 in FIG. 7A), the gating logic device 214 receives the high frequency polarity sensor signal 176 from the polarity sensor 174. The gating logic device 214 also receives a converter voltage output polarity portion 180" of the sensor signal 180 from the output voltage sensor 178. The gating logic device 214 provides a gating logic signal 216 comprising gating logic signal components 216a, 216b, 216c and 216d to a signal isolation and amplification device 218, which may be as described above for device 78 of FIG. 3. The gating logic signals are used by the signal isolation and amplification device 218 to provide the second converter controller signal 184 comprising components 184a–184d to control the respective switch assemblies 190a–190d.

Recall that the link frequency $f_{HF}$ the frequency of transformer 118 established by the first converter 116. If the link frequency is sufficiently high, such as by a factor of twenty or greater than the frequency of the AC source 14, and if the modulation index does not exceed unity, the synthesized signals have a very low order distortion for a wide amplitude and frequency range of the synthesized signal. Furthermore, any high frequency harmonics produced by the switching of the second converter 120 only occur as the side band of the switching frequency. Thus, these high frequency converter harmonics may be eliminated by filter 152 so as not to trouble the critical load 102.

Moreover, in the illustrated HF-link SPS system 100, the high frequency link voltage $v_{in}$ is nearly sinusoidal. The switch assemblies 190a–190d of the second converter 120 change status at zero voltage, that is at the zero crossings of the $v_{in}$ waveform. Referring to FIG. 6, a link current (not shown) flows between the second converter 120 and the HF-link transformer 118. During operation, the link current can change in direction very suddenly. The capacitor 150 of the high frequency link filter 144 provides a link current path for the link current to accommodate these rapid shifts in direction. By choosing the inductance $L_{HF}$ and capacitance $C_{HF}$ of the components of filter 144 parallel resonant at the link frequency $f_{HF}$, the current drawn from second converter 120 at the link frequency $f_{HF}$ is advantageously minimized.

A. Normal Operation

When the AC source monitor 106 determines that the voltage of the AC source 104 is within acceptable limits, the static interrupter 110 conducts to provide power to the critical load 102. Any harmonic distortion current component of the load current $i_{load}$ is detected by the harmonic distortion sensor means. Here the harmonic distortion sensor means are illustrated as comprising the load current sensor 168 and the converter current sensor 166. Sensors 166 and 168 operate in conjunction with a portion of controller 160 as described above with reference to FIG. 2, to provide the error signal $v_{ie}'$.

The harmonic distortion current component is neutralized by providing to the parallel junction 154 the second converter output current $i_{conv}$ of the same amplitude and opposite polarity to that of the distortion component. The required neutralizing converter output current is provided by controlling the opening and closing of switch assemblies 190a through 190d, for example using a tolerance-band control scheme as described above with respect to FIG. 3 for the embodiment of FIG. 1. That is, the error signal $v_{ie}'$, which is generated as described above with respect to FIG. 2, is provided to the comparator 210 (see FIG. 9).

The comparator 210 receives the error signal $v_{ie}'$ from second summer 68, and operates with a tolerance band control scheme as described above with respect to FIG. 3. However, the gating logic device 214 advantageously provides for zero-crossing switching (as described above) of the switch assemblies 190 of converter 120. During normal operation, the area error signal input $e(t)$ or 208 is not provided to the comparator 210. Rather, the comparator 210 compares the error signal $v_{ie}'$ to the tolerance band $T_3$, and if it is outside the tolerance band provides a change area signal 212. The change area signal 212 instructs the gating logic device 214 to either increase, decrease, or maintain the area under the waveform of the output voltage $V_{out}$ (see FIG. 8C) to operate in a current mode. In the current mode of operation, the converter output current $i_{conv}$ follows the reference current signal $v_{iref}$ from the first summer 68 to provide the required harmonics neutralizing current.

The gating logic signal 216 also provides the timing of the switching for converter 120 such that switching only occurs at zero-crossings. To accomplish this, the gating logic device 214 receives inputs from the high frequency polarity sensor 174 and the polarity component 180" of the output voltage sensor 178. The gating logic device 214 provides gating logic output signals 216a through 216d to the signal isolation and amplification device 218. Device 218 then provides the second converter control signal components 184a through 184d to the switch assemblies 190a through 190d, respectively. In response to the controller signal 184, the switches 190a through 190d turn on and off to vary the current output of the second converter 120, providing a harmonic distortion neutralizing current in the normal mode of operation.

Furthermore, the controller 160 controls the switches of the first converter 116 to provide the frequency of the voltage waveform received by the second converter through transformer 118, that is the waveform of $v_{in}$ shown in FIG. 8A. Additionally, the first and second converters 116, 120 also operate in unison to charge the battery 114 to a desired voltage level $V_D$ as required by a battery level governing device such as 64 shown in FIG. 2. Charging the battery 114 may be accomplished concurrently with the neutralizing of the harmonic distortion current component of the load current $i_{load}$, as described above for the embodiment of FIG. 1.

B. Emergency Operation

When the AC source monitor 106 detects a collapse of the voltage received from the AC source 104, the controller 160 directs the static interrupter 110 to open and isolate the SPS system 100 from the source 104. At this time, the sinewave generator 200 begins generating a reference voltage signal $v_{ref}$ (FIG. 8B) to simulate the AC source voltage. The summer 202 adds the reference voltage signal $v_{ref}$ with a negative polarity to the converter output voltage signal amplitude portion 180'. The integrator 206 integrates the difference signal 204 from summer 202 to provide the area error signal $e(t)$ 208. The comparator 210 uses the tolerance band control scheme, ignoring the error signal input $v_{ie}$ during emergency operation, since the AC source 104 has been disconnected from the HF-link SPS system 100 by the opening of interrupter 110.

When the area error signal 208 exceeds the tolerance band $T_3$, the comparator 210 provides the change area signal 212 to the gating logic device 214 to increase, decrease, or hold the area under the $v_{out}$ waveform constant. The gating logic device 214 decides which combinations of the switch assemblies 190a through 190d must be turned on so the area under the $v_{out}$ waveform (FIG. 8C) synthesizes the area under the reference $v_{ref}$ waveform (FIG. 8B). In this manner, DC power from the battery 114 is converted into AC power by the first converter 116 for delivery through transformer 118 and the second converter 120 to provide uninterrupted power to the critical load 102. Thus, the output of the converter 120 is the power required by the critical load 102, rather than the harmonic distortion neutralizing current supplied during normal operation.

The HF-link SPS system 100 with the use of the HF-isolation transformer 118 advantageously allows the battery 114 to have a lower DC bus voltage level rating than that of the FIG. 1 embodiment. This lower DC bus voltage of battery 114 advantageously allows for higher battery reliability. Furthermore, it is safer for an operator to work with lower DC bus voltages. Also, a lower EMI (electromagnetic interference) is realized if one of the terminals of the electrically-isolated battery 114 may be grounded. Furthermore, an operating frequency of the HF-link SPS system 100 on the order of 20 kHz is above the audible frequency range. Additionally, the use of the optional 60 Hz isolation transformers 108 and 112 also minimizes audible noise problems. Similarly, the isolation transformers 82, 84 and 86 of the SPS system 10 in FIGS. 1 through 4 also minimize noise problems.

Having illustrated and described the principles of my invention with respect to a preferred embodiment, it should be apparent to those skilled in the art that my invention may be modified in arrangement and detail without departing from such principles. For example, other inverters and converters may be used, as well as other methods of generating gate signals to control the chosen inverter or converter in the manner described herein. Furthermore, other types of sensors may be used to provide inputs to controller 60 or 160. With respect to the embodiment of FIGS. 5-9, alternately, the first and second converters 116, 120 may communicate directly or operate in unison. Furthermore, the first converter 116 may be controlled to facilitate the operation of the second converter 120 in either the normal or emergency mode of operation.

I claim:

1. A standby power supply system, comprising:
    a single converter having an AC side and a DC side, with the AC side for coupling in parallel with a load normally powered by an AC source, the converter supplying emergency AC power to the load during failure of the AC source, with the load drawing a load current having harmonic distortion;
    a back-up power source coupled to the DC side of the converter;
    a harmonic distortion sensor for sensing the load current harmonic distortion during normal operating conditions; and
    a controller responsive to the harmonic distortion sensor for causing the converter to produce a harmonics neutralizing current to substantially neutralize the load current harmonic distortion and isolate the harmonic distortion form the AC source to draw only sinusoidal current therefrom, wherein the controller comprises a comparator which maintains the converter output within selected limits.

2. A standby power supply system according to claim 1 wherein the comparator comprises a tolerance band controller.

3. A standby power supply system according to claim 1 wherein the comparator comprises a fixed frequency controller.

4. A standby power supply system comprising:
    a single inverter having an AC side and a DC side, with the AC side for coupling in parallel with a load normally powered by an AC source, the inverter supplying emergency AC power to said load during failure of the AC source, with the load drawing a load current having harmonic distortion;
    a back-up power source coupled to the DC side of the inverter;
    a harmonic distortion sensor for sensing the load current harmonic distortion during normal operating conditions, said harmonic distortion sensor including
        a load current sensor for sensing the load current including the harmonic distortion to produce, a load current source signal comprising a line current component and a harmonic distortion current component; and
        an inverter current sensor for sensing the AC current produced by the inverter; and
    a controller responsive to the load current sensor and the inverter current sensor, said controller including a line frequency notch filter which receives the load current sensor signal and removes the line current component therefrom to produce a distortion signal, causing the inverter to produce a harmonic neutralizing current to substantially neutralize the harmonic distortion and isolate the harmonic distortion from the AC source to draw only sinusoidal current therefrom.

5. A standby power supply system comprising:
    a single inverter having an AC side and a DC side, with the AC side for coupling in parallel with a load normally powered by an AC source, the inverter supplying emergency AC power to the load during failure of the AC source, with the load drawing a load current having harmonic distortion;
    a back-up power source coupled to the DC side of the inverter;
    a harmonic distortion sensor for sensing the load current harmonic distortion during normal operating conditions; and
    a controller producing an inverter control signal responsive to the harmonic distortion sensor for causing the inverter to produce a harmonics neutralizing current to substantially neutralize the harmonic distortion and isolate the harmonic distortion from the AC source to draw only sinusoidal current therefrom;
    wherein the inverter comprises a bridge type inverter having four legs with each leg having a switching device in parallel with a diode, with each switching device being responsive to the inverter control signal to neutralize the harmonic distortion and charge the back-up power source during normal operating conditions, and generate the emergency AC power for the load.

6. A method to claim 22 wherein of supplying AC power to a load during normal and emergency operating conditions, the method comprising the steps of:
    coupling a standby power supply system in parallel with the load and an AC source, the system including:
        a power conversion device having an AC side and a DC side, with the AC side in parallel with the AC source and the load, the power conversion device responsive to a control signal;
        a back-up power source coupled to the DC side of the power conversion device;
        a harmonic distortion sensor; and
        a controller; during normal operating conditions:
    powering the load with the AC source, with the load drawing a load current having harmonic distortion;
    charging the battery bank with a charging current produced by the power conversion device;
    sensing the harmonic distortion with the harmonic distortion sensor;
    controlling the power conversion device with the controller in response to the harmonic distortion sensor, said controlling step including the steps of:
        producing a distortion signal corresponding to the harmonics harmonic distortion and a charging current signal corresponding to the charging current; and
        producing a reference signal corresponding to a desired power conversion device current by removing the charging current signal from the distortion signal;
        sensing the power conversion device current and producing a conversion current sensor signal in response thereto; and
        producing an error signal by removing the conversion current sensor signal from the reference signal; and
    isolating the harmonic distortion from the AC source to draw only sinusoidal current therefrom by producing an AC harmonics neutralizing current with the power conversion device in response to the controller;

during emergency operating conditions:
isolating the standby power supply system and the load from the AC source when the AC power source voltage collapses below a predetermined acceptable value;
controlling the power conversion device with the controller; and
inverting back-up power from the back-up power source with the power conversion device in response to the controller to supply emergency AC power to the load.

7. A method according to claim 6 wherein the method further includes the steps of:
comparing the error signal with a selected tolerance band; and
changing the control signal to return the error signal to a value within the tolerance band when the error signal exceeds the tolerance band.

8. A method according to claim 7 wherein the method further includes the steps of:
comparing the error signal with a selected triangular waveform signal to provide a difference signal;
determining the polarity of the difference signal; and
changing the control signal so as to drive the AC conversion current to follow the desired power conversion device current.

9. A standby power supply system comprising:
a single converter having an AC side and a DC side, with the AC side for coupling in parallel with a load normally powered by an AC source, the converter supplying emergency AC power to the load during failure of the AC source, with the load drawing a load current having harmonic distortion;
a back-up power source coupled to the DC side of the converter;
a harmonic distortion sensor for sensing the load current harmonic distortion during normal operating conditions, said harmonic distortion sensor including
a converter current sensor for sensing AC current produced by the converter, and
a load current sensor for sensing the load current drawn by the load;
a controller responsive to the harmonic distortion sensor for causing the converter to produce a harmonics neutralizing current to substantially neutralize the load current harmonic distortion and isolate the harmonic distortion from the AC source to draw only sinusoidal current therefrom;
a first isolation transformer located between the AC source and the converter;
a second isolation transformer located between the converter and the converter current sensor; and
a third isolation transformer located between the load current sensor and the load.

10. A standby power supply system comprising:
a single converter having an AC side and a DC side, with the AC side for coupling in parallel with a load normally powered by an AC source, the converter supplying emergency AC power to the load during failure of the AC source, with the load drawing a load current having harmonic distortion;
a back-up power source coupled to the DC side of the converter, wherein the back-up power source comprises a battery bank that receives a charging current from the converter for charging the battery bank during normal operating conditions;
a harmonic distortion sensor for sensing the load current harmonic distortion during normal operating conditions; and
a controller responsive to the harmonic distortion sensor for causing the converter to produce a harmonics neutralizing current to substantially neutralize the load current harmonic distortion and isolate the harmonic distortion from the AC source to draw only sinusoidal current therefrom.

* * * * *